United States Patent [19]

Eberhard et al.

[11] Patent Number: 5,420,429
[45] Date of Patent: May 30, 1995

[54] MULTILAYER TRANSDUCER ARRAY

[75] Inventors: Jeffrey W. Eberhard; Kristina H. V. Hedengren, both of Schenectady, N.Y.

[73] Assignee: General Electric Company, Schenectady, N.Y.

[21] Appl. No.: 133,354

[22] Filed: Oct. 8, 1993

[51] Int. Cl.⁶ ............................................. G01T 1/20
[52] U.S. Cl. ................................ 250/367; 250/370.11
[58] Field of Search ..................... 250/367, 368, 370.11

[56] References Cited

U.S. PATENT DOCUMENTS

| 4,037,105 | 7/1977 | Laurer | 250/367 |
| 4,639,600 | 1/1987 | Laurer | 250/367 |
| 5,059,800 | 10/1991 | Cueman et al. | 250/367 |

FOREIGN PATENT DOCUMENTS 0085386 4/1988 Japan ................................. 250/367

Primary Examiner—Paul M. Dzierzynski
Assistant Examiner—Richard Hanig
Attorney, Agent, or Firm—Paul R. Webb, II

[57] ABSTRACT

Transducer arrays are constructed using multiple layers of transducer elements, each layer of transducer elements having energy passages such as spaces to allow free passage of energy to or from transducer elements in another layer. Each transducing element performs the same transducing (energy conversion) as the other transducing elements. The transducer arrays may be detector arrays having scintillation materials for detection of x-ray or other high energy rays with each element operable to detect the same type of energy (e.g., x-ray, gamma ray, ultrasound, etc.) as the other elements. Multiple layering of the detector elements allows construction of a diced or mosaic detector array without restrictions upon the thickness of the individual elements which might otherwise result from the kerf width.

21 Claims, 6 Drawing Sheets

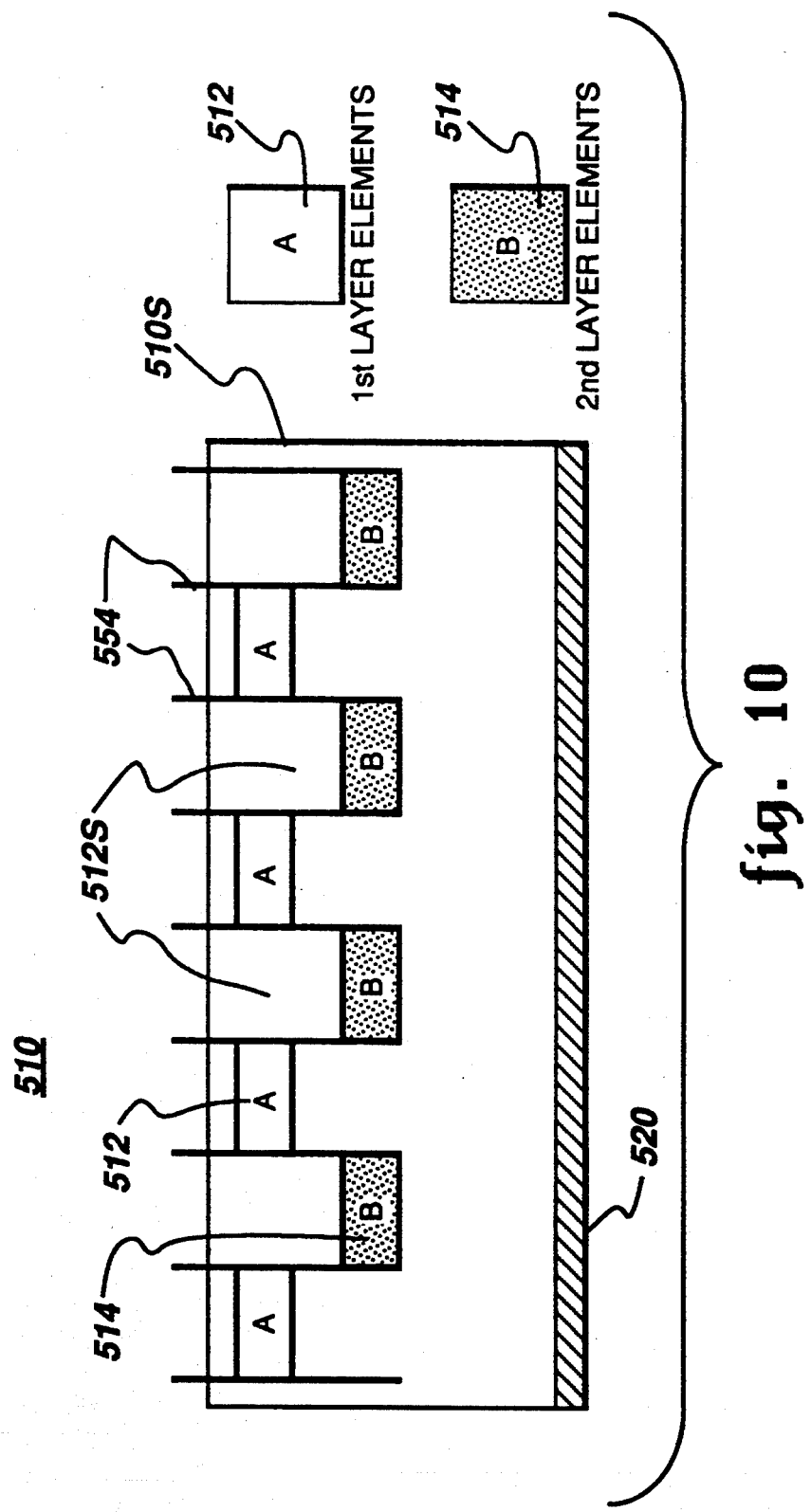

MULTILAYER TRANSDUCER ARRAY

BACKGROUND OF THE INVENTION

This invention relates to a multilayer transducer array for transducing energy. More specifically, this invention relates to an array having energy transducing elements arranged in rows and/or columns in multiple layers. The transducing elements are used for detecting or providing energy in a desired form.

Various known arrangements have been used for detecting energy passing through a given area. Although such area detectors are generally planar, specific applications may use area detectors having curved surfaces. Regardless of the shape, such area detectors detect energy falling within a given area, either planar or curved. Usually, such area detectors provide information about the location of the energy falling upon the area detector. In other words, such area detectors often distinguish between energy falling on one part of the area detector and energy falling upon another part of the area detector. Such a determination of the location of the energy hitting the detector is necessary for use of the area detectors in imaging systems.

Imaging systems commonly use area detectors to provide an image of an object, person, or other thing of interest based upon energy received by the area detector. The energy detected by the area detector may have passed through an object of interest. For example, if the imaging system is for medical or industrial three-dimensional (3D) computerized tomography (CT), x-ray or similar imaging energy will have passed through an object of interest such as a workpiece or patient. Other imaging systems may receive energy which has been reflected by an object (workpiece, person, or other thing or things) of interest. Still other imaging systems may detect energy, such as infrared energy generated by a machine, human, or other animal, originating from the object of interest.

Area detectors often have an array of detecting elements arranged in rows and columns, but linear detectors with an array of detection elements arranged in a single row or column are sometimes used in imaging and other systems where it is necessary simply to detect energy along a given line.

In either a two-dimensional (i.e., elements in rows and columns) detector array or a linear detector used for x-ray or similar high energy imaging, increasing the thickness of scintillation material in the detecting elements will increase in the efficiency of detection. That is, a thicker slab of scintillation material will more efficiently convert high energy radiation like x-rays and gamma rays into visible light (which in turn is sensed by a charge coupled device, called CCD, camera or similar light sensing arrangement). However, increasing the thickness of the scintillator slab reduces the spatial resolution because the light spreads in the scintillator.

U.S. Pat. No. 5,059,800 issued Oct. 22, 1991 to Cueman et al., assigned to the assignee of the present application, entitled "Two-Dimensional Mosaic Scintillation Detector", hereby incorporated by reference, discloses a technique for dicing a scintillator into small elements with reflective material placed between the elements to reduce optical cross talk. This design greatly improved the spatial resolution of the detectors, but limits the thickness of the detector elements. Specifically, there are difficulties making very deep cuts in the scintillation material with a very fine kerf (i.e., a fine cut). For a given thickness of scintillation material, the kerf width or distance from one side of the cut to the other side of the cut (i.e., perpendicular to the direction of cutting or end-to-end direction of the cut) must have a certain minimum size. If the material thickness is increased to maximize efficiency of detection, the required increase in the kerf will, to some extent at least, decrease the efficiency of detection. In other words, x-rays or other high energy being detected may strike the space in between adjacent elements of the scintillator. Thus, the use of a mosaic of diced elements improves spatial resolution, but the detection efficiency may be degraded.

OBJECTS AND SUMMARY OF THE INVENTION

Accordingly, it is a primary object of the present invention to provide a new and improved transducer array.

A more specific object of the present invention is to provide an array detector with both high efficiency (i.e., good stopping power for x-rays or other high energy) and high spatial resolution.

A still further object of the present invention is to provide a detector array which may be readily fabricated.

A further object of the present invention is to provide an imaging detector with reduced cross talk.

Yet another object of the present invention is to provide a detector array with collimation.

The above and other objects of the present invention which will become apparent as the description proceeds are realized by a transducer array having a first layer with first transducing elements arranged in a pattern and a plurality of first energy passages between and adjacent to the first transducing elements. A second layer has second transducing elements arranged in a pattern offset in an energy direction from the first layer, each of the second transducing elements in registry with a corresponding one of the first energy passages. Each of the first energy passages allows free passage of energy which interacts (meaning the type of energy which may interact) with the second transducing elements. The passages may be spaces or have material which allows passage of the energy. As used herein, the energy interacts with the second transducing element if the energy is detected by the second transducing element or the energy is output by the second transducing element. The energy direction is the preferred direction of energy for detection by the transducing elements or the preferred direction in which the transducing element provides or outputs energy. Each of the first and second transducing elements is made of transducing material which provides improved transducing when the thickness of the transducing material is increased. The transducing material is selected from the group consisting of plastic materials, crystalline materials, and ceramic materials. The transducing material may alternately be selected from the group consisting of scintillating materials and piezoelectric materials.

In an embodiment, each of the first and second layers is planar.

The second layer has a plurality of second energy passages between and adjacent to the second transducing elements, there being a second energy passage in registry with, and corresponding to, each of said first transducing elements. As used herein, an energy passage would be in registry with a transducing element if the energy passage is in line with the transducing element in the energy direction.

The array may further include means for receiving energy rays passing from the first transducing elements through the second energy passages and for receiving energy rays from the second transducing elements. In one embodiment, each of the first and second transducing elements is made of scintillation material. In that embodiment, collimator plates may extend generally in the energy direction and be disposed at outer peripheries of each of the first and second transducing elements.

An alternate embodiment has a first support with at least some of the first transducing elements being scintillation material mounted thereto and a second support having at least some of the second transducing elements being scintillation material mounted thereto, the first support being transparent to energy which triggers scintillation in the scintillation material and the second support being transparent to light. More preferably, both of the first and second supports are transparent to both the energy which triggers scintillation and the light. This embodiment may further include a third support separated from the first support by the first transducing element with at least some of the first transducing elements mounted to the third support. Further, a fourth support is separated from the second support by the second transducing elements and at least some of the second transducing elements are mounted to the fourth support.

A four layer embodiment of the transducer array further includes a third layer with third transducing elements arranged in a pattern offset in the energy direction from the second layer and a plurality of third energy passages between and adjacent to the third transducing elements, each of the third transducing elements in registry with a corresponding one of the first energy passages and in registry with a corresponding one of the second energy passages. A fourth layer includes fourth transducing elements arranged in a pattern offset in the energy direction from the second layer, each of the fourth transducing elements in registry with a corresponding one of the first energy passages, in registry with a corresponding one of the second energy passages, and in registry with a corresponding one of the third energy passages. Each of the third and fourth transducing elements is made of a scintillation material which provides improved transducing when the thickness of the transducing material is increased. This four layer embodiment may also include collimator elements extending generally in the energy direction and disposed at outer peripheries of each of the first, second, third, and fourth transducing elements.

The transducer array is preferably two dimensional with the first and second transducing elements both arranged in rows and columns. The transducer array is preferably a detection array and the first and second transducing elements are detection elements.

The present invention may alternately be described as a detection array having a first layer with first detecting elements arranged in a pattern and a plurality of first energy passages between and adjacent to the first detecting elements. A second layer has second detecting elements arranged in a pattern offset in an energy direction from the first layer, each of the second detecting elements in registry with a corresponding one of the first energy passages, each of the first energy passages allowing free passage of energy which is detectable by the second detecting elements. Each of the first and second detecting elements is made of detecting material such as scintillation material, piezoelectric material or other materials which sense some form of energy. The detecting material is preferably selected from the group consisting of: scintillating materials and piezoelectric materials. The second layer has a plurality of second energy passages between and adjacent to the second detecting elements, there being a second energy passage in registry with, and corresponding to, each of the first detecting elements. The detection array is two-dimensional with the first and second detecting elements both arranged in rows and columns. The detecting material provides improved detecting when the thickness of the detecting material is increased.

BRIEF DESCRIPTION OF THE DRAWINGS

The above and other features of the present invention will more readily understood when the following detailed description is considered in conjunction with the accompanying drawings wherein like characters represent like parts throughout the several views and in which:

FIG. 10 shows a simplified cross-section view along one row of a four layer transducer array according to the present invention.

DETAILED DESCRIPTION

Figure 1:
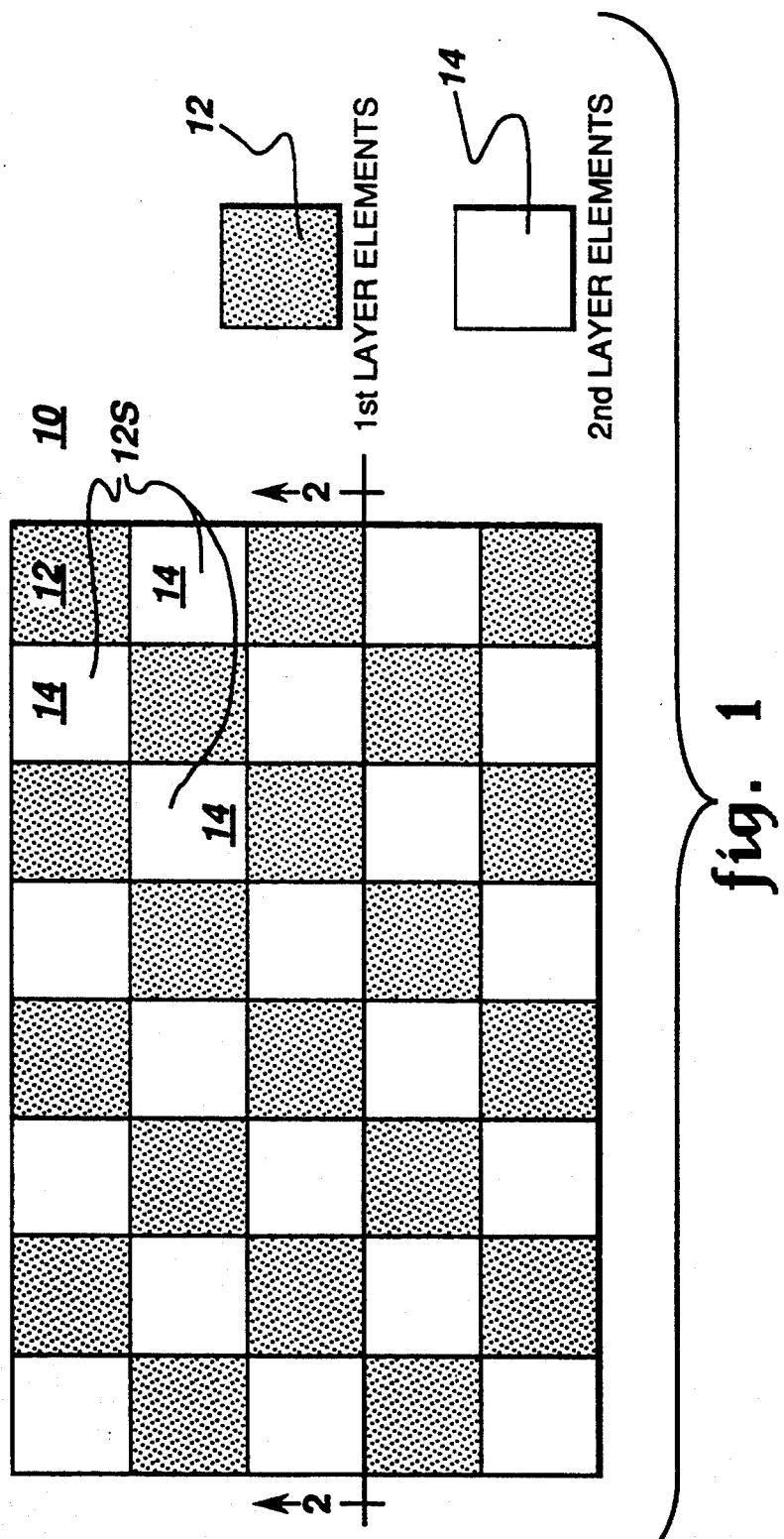
FIG. 1 shows a top view of a double layer two-dimensional transducer array according to the present invention and an associated legend.

With reference now to FIG. 1, a transducer array 10 according to the present invention will be discussed in detail. The transducer array 10 is more specifically a detector array having a plurality of first layer elements 12 and second layer elements 14. For ease of illustration, only some of the elements are numbered, it being noted that the right side of FIG. 1 shows a legend illustrating how the first layer elements are depicted differently than the second layer elements simply for ease of understanding. It will be appreciated that the elements would ordinarily be identical in construction to each other regardless of which layer they are in.

Continuing to view FIG. 1, but also considering FIG. 2, a simplified cross-section view along lines 2—2 of FIG. 1 combined with a simplified block diagram of an imaging system, the basic principles of operation of the present invention will be discussed. Each of the detector elements 12 and 14 are slabs or blocks of scintillation material. In response to x-rays or other high energy rays, the elements 12 and 14 emit photons of visible light. As readily appreciated from FIG. 2, the various first layer elements 12 are offset from the various second layer elements 14. For ease of illustration, FIG. 2 does not illustrate how the various elements 12 and 14 are supported. Various techniques of support will be discussed below, but other support arrangements could be used.

Figure 2:
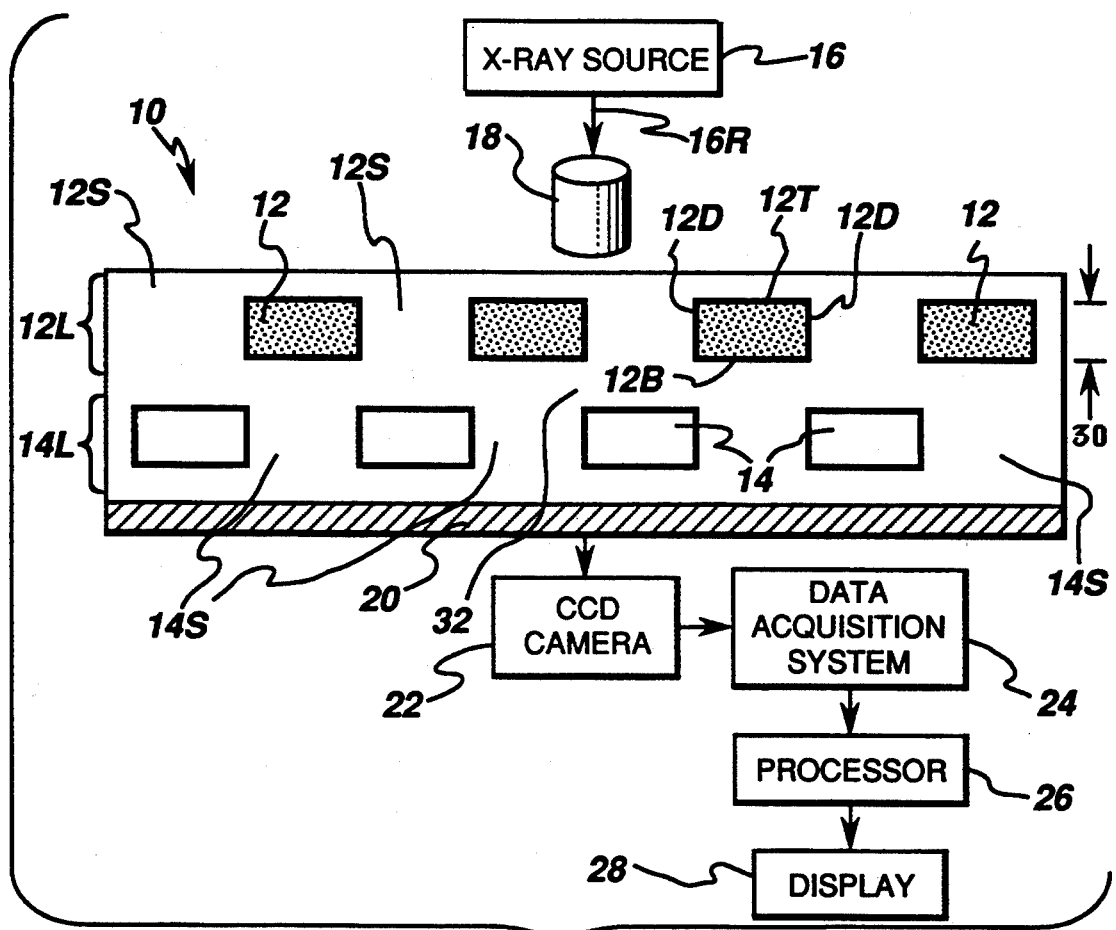
FIG. 2 shows a simplified cross-sectional view taken along lines 2—2 of FIG. 1 combined with a simplified block diagram illustrating how the present invention could be used in an imaging system.

The transducer array 10 of FIGS. 1 and 2 is used for three dimensional computerized tomography imaging, but the principles of the present invention are applicable to other fields as will be discussed in more detail below. As shown in FIG. 2, an x-ray source 16 applies x-rays to an object 18 which is to be imaged. Although not shown in FIG. 2, such three-dimensional imaging has a scanning arrangement to cause movement of the object 18 relative to the source 16 and detector 10. If the object 18 is an industrial workpiece or similar mechanical object, it is often rotated or otherwise moved relative to the source 16 and detector 10 which remain stationary. If the object 18 which is to be imaged is a medical patient, the source 16 and detector 10 are usually moved while the patient remains stationary. Since the scanning in such a system is well known, it need not be described in detail.

The detector 10 has a lens or mirror 20 which is used to supply visible light to a charge-coupled device (CCD) camera 22 or similar device for detecting visible light. The visible light would of course be that which results from x-rays striking the scintillation material of detector elements 12 and 14. The camera 22 is connected to a data acquisition system 24 which supplies data to an image processor 26. The processor 26 in turn is connected to a display 28 which displays images based upon the three-dimensional computerized tomography in known fashion. Since the operation of the components 16, 22, 24, 26, and 28 are well known, they need not be described in detail. Instead, the present description will concentrate on the construction and principles of operation of the detector array 10 and similar detector arrays discussed below.

In the detector array 10 of FIGS. 1 and 2, the first layer elements 12 are part of a first layer 12L (labeled in FIG. 2 only) and the second layer elements are part of a second layer 14L (labeled in FIG. 2 only). The first layer 12L includes a plurality of first layer spaces 12S (only some of which are numbered) in between and adjacent to the elements 12. In similar fashion, the second layer 14L has a series of second layer spaces 14S in between adjacent pairs of the second layer elements 14 and adjacent to the elements 14. In the arrangement of FIGS. 1 and 2, the detector array 10 has rectangular planar layers 12L and 14L, although it should be appreciated that the principles of the present invention also allow for non-rectangular shapes for the array and detectors, for example, wherein the two layers are curved instead of planar.

As shown, each of the layers 12L and 14L are offset from each other in an energy direction corresponding to the general direction of the x-rays 16R (16R is central axis of conical beam) from the source 16. With reference to FIGS. 1 and 2, each of the second layer elements 14 is the same size (or at least substantially the same size) as one of the first layer spaces 12S. More specifically, each of the second layer elements is in registry with a corresponding one of the spaces 12S from the first layer. In similar fashion, each of the first layer elements 12 is the same size (or at least substantially the same size) as a corresponding one of the second layer spaces 14S which is in registry therewith. The spaces 12S are in registry with the elements 14 in the sense that energy proceeding along the energy direction which passes between the first elements 12 will proceed along the energy direction to strike the elements 14 in the second layer 14L.

It should be appreciated that the spaces 12S serve as energy passages and would not necessarily have to be empty space, but could be filled of any material which would allow free passage of the type of energy (x-rays in the embodiment shown) which would be detected by the elements 12 and 14. Thus, the spaces 12S in the first layer may more generally be thought of as energy passages, which allow passage of the energy between the outside of the detector array 10 and the second layer detection elements 14. In similar fashion, the spaces 14S need not necessarily be empty spaces, but could hold material which would allow passage of the visible light resulting from scintillation of first layer detector elements 12 such that the visible light could fall upon the lens or mirror 20 used to supply the camera 22. Thus, the second layer spaces 14S may more generally be thought of as energy passages.

By use of the double layer detector array of FIGS. 1 and 2, high detection efficiency may be combined with good spatial resolution. As discussed in more detail in the background portion above, use of the detector elements (such as 12 and 14) all within a single layer means that cuts have to be made in between adjacent detection elements. Such cuts in the scintillation material making up the detector elements limit the thickness 30 (FIG. 2) of each detector element to about 10 times the spacing in between adjacent detector elements in such a single layer detector array. Therefore, in such a single layer detector array, the thickness of the detector elements could not be increased without also increasing the spacing in between adjacent detector elements. In a single layer detection array, the energy falling in between detection elements might not be sensed such that increasing the spacing is at least partly counter-productive.

In the detector array 10 of FIGS. 1 and 2, the thickness of the detector elements 12 and 14 is not limited to about 10 times the spacing between adjacent detector elements. Thus, the detector elements 12 and 14 may be sufficiently thick (the dimension 30 in FIG. 2) so as to provide a very high detection efficiency. At the same time, there is no requirement to provide a cut in between adjacent detector elements which might allow x-ray energy to escape detection. Instead, substantially all of the x-ray energy from the source 16 will strike one of the detector elements 12 or 14. Given that the thickness of the detection elements 12 and 14 may be greater than in previous designs, the detection efficiency will be improved. At the same time, the high spatial resolution of such a mosaic detection array will be maintained.

Since the mirror or lens 20 is used to supply visible light to the camera 22 and it is highly desirable that the visible light only be that light resulting from scintillation of x-rays within the detector elements 12 and 14, techniques may be used in order to minimize other visible light from reaching the lens or mirror 20. In particular, and with reference to FIG. 2, each of the detector elements 12 may have its top surface 12T and four side surfaces 12D (but not bottom surfaces 12B) coated with a thin layer (not separately shown) of light reflective film which is transparent to x-rays. The detector elements 14 in the second layer would have the same coatings on all of their surfaces except the bottom surfaces. Therefore, any visible light produced from an x-ray passing into one of the detector elements 12 or 14 would either proceed directly out the bottom of the detector element towards the lens or mirror 20 or, alternately, if the visible light was directed in another direction, it would likely bounce off the inside of the reflective coating back out the bottom of the detector element to the lens or mirror 20. Further, such a reflective coating would minimize visible background light passing into a detector element and proceeding to the lens or mirror 20. Although not shown, visible light blocking barriers could be used in the intervals such as 32 in FIG. 2 in order to avoid off angle (i.e., not parallel or substantially parallel to energy direction corresponding to x-ray 16R) visible light from passing through 32 on to the lens or mirror 20. Other light shielding techniques could be used to minimize stray or undesired light from reaching the mirror or lens 20.

Figure 3:
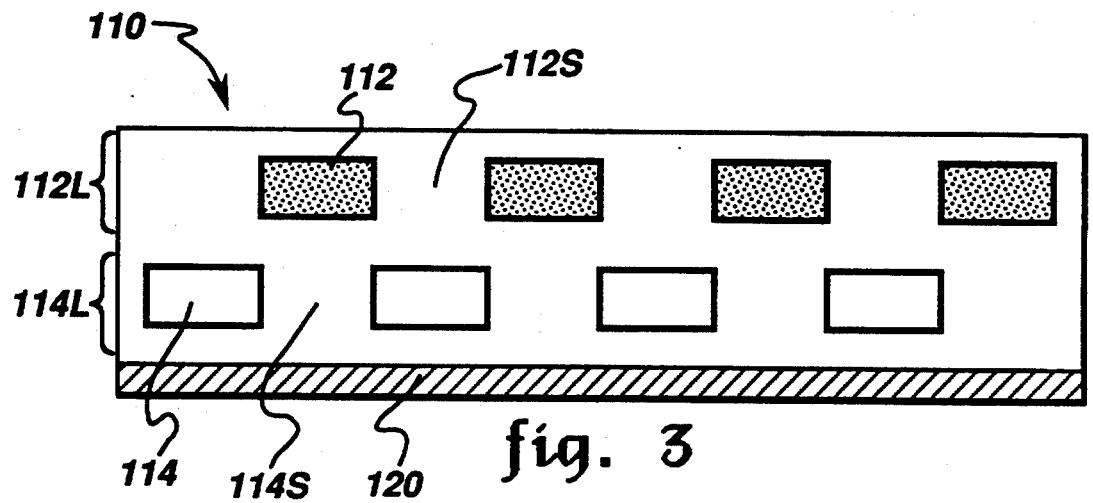
FIG. 3 shows a simplified cross-sectional view of a second embodiment transducer array according to the present invention.

With reference now to FIG. 3, an alternate embodiment detector array 110 according to the present invention will be discussed in detail. The array 110 of FIG. 3 would have the same checkerboard pattern as illustrated in FIG. 1 and has components labeled in the "100" series with the same last two digits as the corresponding component, if any, of the embodiment of FIGS. 1 and 2.

Since the arrangement of FIG. 3 operates in substantially the same fashion as the arrangement of FIGS. 1 and 2, only the differences in construction and operation will be noted. The array 110 has a first layer 112L with detector elements 112 and energy passages or spaces 112S and a second layer 114L with second layer detector elements 114 and energy passages 114S. A mirror or lens 120 would be used to supply light to a CCD camera (not shown) or other photo detection system. The detector 110 of FIG. 3 would of course be used in an imaging system having components similar to that illustrated for FIG. 2.

Array 110 is different from array 10 in that the spaces 112S in the first layer are in registry with corresponding second layer elements 114 which are somewhat larger than the spaces. Likewise, the spaces 114S are in registry with detector elements 112 which are somewhat larger than the spaces 114S. The detector elements 112 and 114 will generate visible light upon being hit by x-rays, gamma rays, or other high energy rays in the same fashion as discussed with respect to array 10. As a practical matter, the arrangement of FIG. 3 is advantageous because the manufacturing tolerances would not need to be as exact as in the arrangement of FIGS. 1 and 2. In other words, the arrangement of FIG. 3 provides more flexibility in the tolerance for the sizes of the detector elements.

Figure 4:
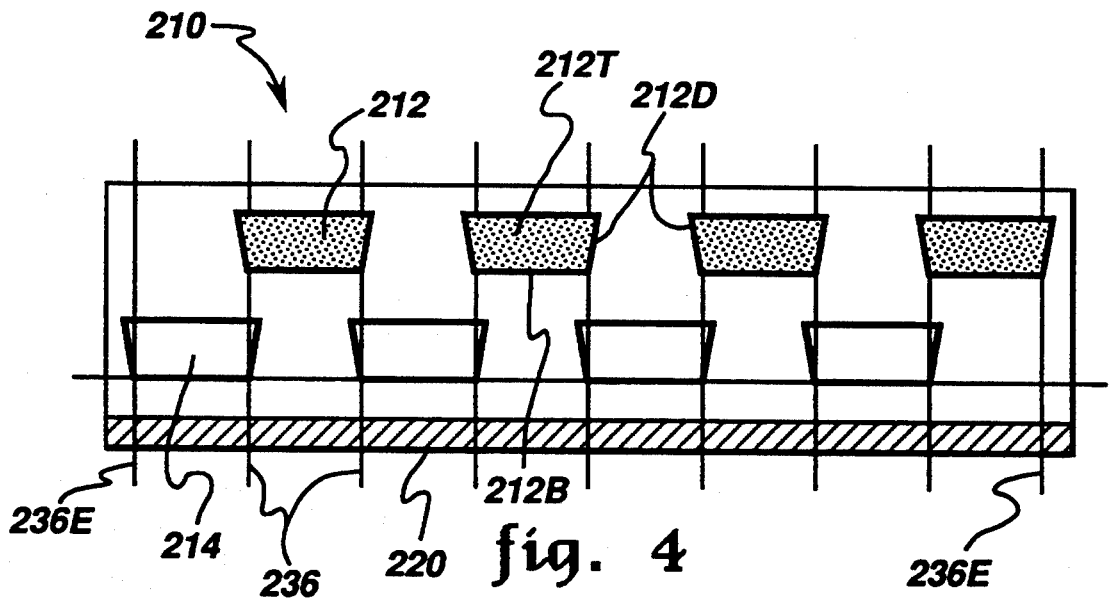
FIG. 4 shows a simplified cross-sectional view of a third embodiment transducer array according to the present invention.

FIG. 4 shows a third embodiment detector array 210 according to the present invention with parts in the "200" series having the same last two digits as the corresponding part, if any, in the detector array 10 of FIGS. 1 and 2. The detector array 210 has a plurality of first layer detector elements 212 and a plurality of second layer detector elements 214 and a lens or mirror 220. Again, the discussion will emphasize the manner in which this embodiment is different than the other embodiments. In particular, the detector elements 212 and 214 have sidewalls such as labeled 214D which are tapered in as they proceed down. Thus, the top 212T of the elements is wider than the bottom 212B of the elements such as 212. The elements 214 would be constructed in the same fashion. Each of the elements 212 and 214 may have rectangular tops 212T and bottoms 212B with four tapered sidewalls 212D in between them. A series of vertical lines 236 are shown simply to illustrate the tapering of the sidewalls such as 212D and to illustrate the edges of the coverage of the detector corresponding to the vertical lines 236E. The tapered sidewalls such as 212 D may be used to mount the elements 212 and 214 within collimator plates or other supports in a manner discussed below.

Figure 5:
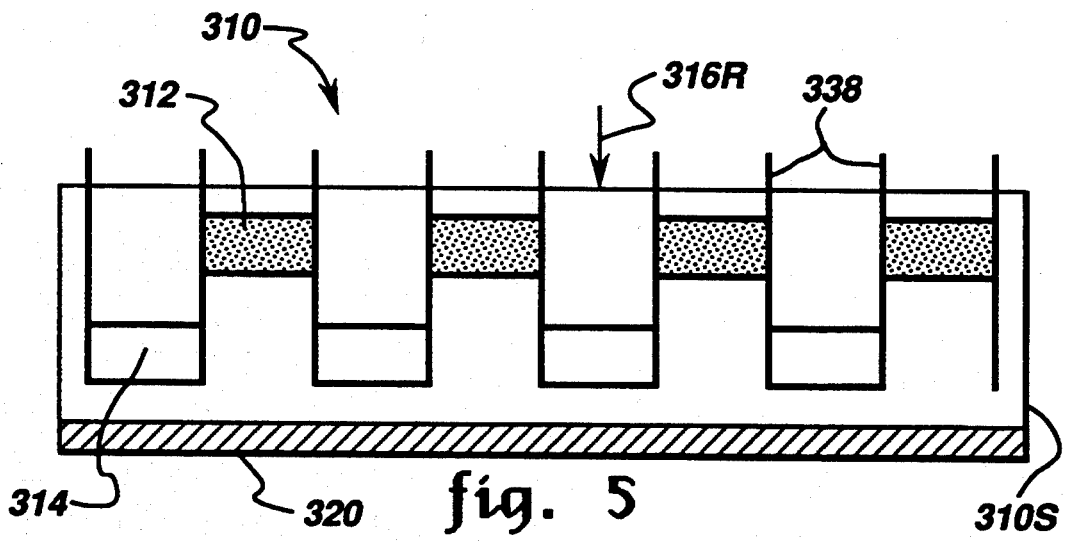
FIG. 5 shows a cross-sectional view of a fourth embodiment of the present invention.

FIG. 5 shows a fourth embodiment detector array 310 according to the present invention with parts in the "300" series with the same last two digits as the corresponding part, if any, in the array 10 of FIGS. 1 and 2. As with the various other alternate embodiments, discussion will emphasize the differences from the arrangement of array 10 since the operation and construction of the numerous alternate embodiments will be identical to that of array 10 except as discussed. In the arrangement of array 310, a plurality of first layer detector elements 312 are offset in an energy direction (i.e., corresponding to the direction 316R of impending x-rays) from a plurality of second layer detector elements 314. The detector elements provide visible light to a lens or mirror 320.

The arrangement of array 310 is different from the prior embodiments in that collimator plates 338 would extend on all four sides of each of the elements 312. It will be appreciated that the cross-section of FIG. 5 only shows two of the four sides of each of the elements 312 and 314, but such collimator plates 338 would be disposed to essentially provide a square or rectangular vertical channel parallel to the direction 316R and in which one of the elements 312 or one of the elements 314 would be disposed. The various collimator plates 338 would be made of tungsten or some other material which is relatively opaque to x-rays. Therefore, background x-rays or x-rays scattered by the object of interest would be less likely to strike the detector elements 312 and 314 since many of those undesired x-rays would be proceeding in a direction significantly different from the direction 316R.

If desired, the tops and/or sides of the detector elements 312 and 314 could be coated with x-ray transparent, light wave reflective films as discussed above with respect to detector array 10, it being noted that the numerous other embodiments of the present invention could likewise have such a reflective coating feature.

The various collimator plates 338 are connected together to form a rigid frame work to which the various detector elements 312 and 314 are glued or otherwise fixed. Additionally, the overall detector 310 may have four sidewalls 310S (only one of which is shown for ease of illustration). The four sidewalls such as 310S would extend in a rectangle corresponding to the outer parameter of the array 310 and would have the outer ones of the collimator plates 338 secured to the four sidewalls 310S.

The collimator plates 338 could have tapered sidewalls (not shown) or be slanted (not shown) such that tapered sidewall elements 212 and 214 (FIG. 4 only)

could be dropped in the spaces between the plates so as to position the elements at the proper vertical positions.

Figure 6:
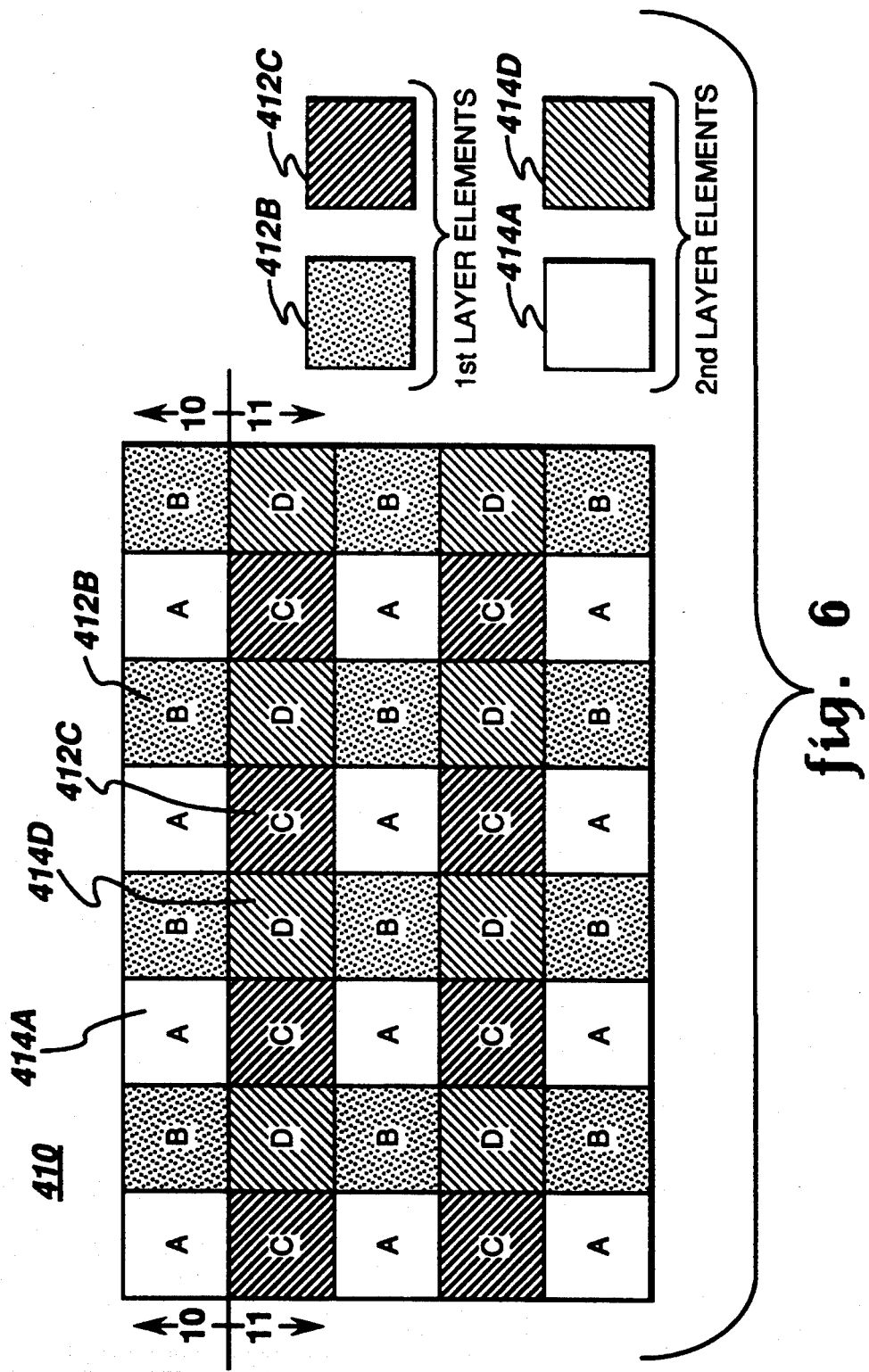
FIG. 6 shows a top view and legend of a transducer array according to the present invention and including labels useful for discussing the practical implementation of the transducer array.

With reference now to FIG. 6, a detector array 410 according to the present invention will be discussed in detail. The array 410 has component parts in the "400" series with the same last two digits as the corresponding component in the array 10 of FIGS. 1 and 2. The construction and operation of array 410 is the same as discussed previously except for the differences which will be noted below. As with FIG. 1, the right side of FIG. 6 is a legend indicating patterns used to illustrate different elements.

The arrangement of FIG. 6 is a double layer detector array similar to that of FIG. 1. However, the first layer elements are of two types 412B and 412C, some of which are simply labeled with B and C respectively in FIG. 6 for ease of illustration. Although the elements 412B and 412C are identical in construction and disposed within the first layer of detector array 410, the significance of the distinction between elements 412B and 412C will be explained with reference to the exploded view of FIG. 7. In particular, the first layer corresponding to elements 412B and 412C would be constructed by having elements 412B secured to a first or upper planar mounting support or backing 440U. In similar fashion, the first layer elements 412C would be glued or otherwise secured to a planar mounting support or backing 440L. The upper and lower backings 440U and 440L are moved together from their positions in FIG. 7 until the separation distance between upper and lower backings 440U and 440L is equal to the thickness of the elements 412B and 412C (all the elements have the same thickness). The backings 440U and 440L are secured together by glue or otherwise. For example, the elements 412C, which were previously glued to backing 440L, could be glued to backing 440U. In similar fashion, the elements 412B, which were previously glued to backing 44U, could be glued to backing 440L in order to produce a sandwich structure with the elements 412B and 412C disposed within a single planar layer in between the planar and parallel backings 440U and 440L. As will be apparent by reference to FIG. 6, there will be a first layer space 412S disposed between adjacent ones of the elements 412C. This is a result of the fact that elements 412B are in the odd rows of FIG. 6 and elements 412C are in the even rows of FIG. 6.

Figure 7:
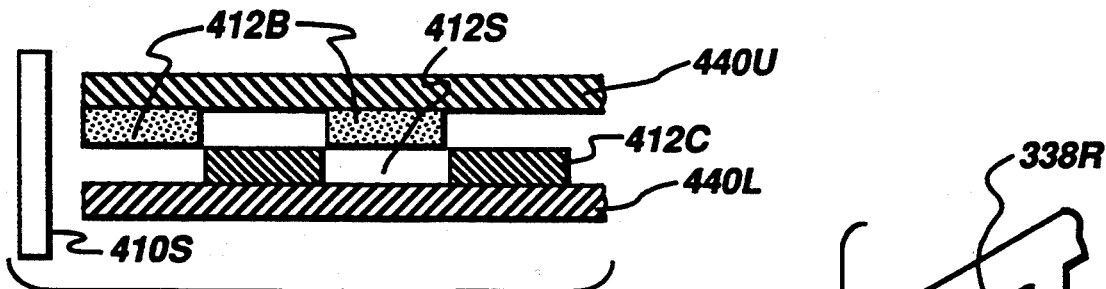
FIG. 7 shows an exploded cross-sectional view of one of the layers of the transducer array of FIG. 6.

The sandwich structure resulting from securing backings 440U and 440L together with the elements 412B and 412C disposed between them may be secured to an array sidewall 410S (only one of which is illustrated in FIG. 7). There would be four of the sidewalls 410S (not illustrated in FIG. 6) which would extend in a box-like fashion around the periphery of the array 410. A mirror or lens (not shown in FIGS. 6 or 7) would be disposed on the bottom of this box-like structure and would function in the same manner as discussed with respect to mirror or lens 20 of FIG. 2. The backings 440U and 440L could be secured to all four of the sidewalls 410S.

Although not shown in FIG. 7, the second layer elements 414A and 414D of FIG. 6 are assembled into a common second layer by mounting elements 414A upon one backing, mounting elements 414D upon another backing, securing the two backings together to form a sandwich structure, and attaching the sandwich structure to the four sidewalls 410S. (It will be understood that FIG. 7 simply shows a broken away upper portion of one sidewall 410S.)

In order for the sandwich structures made from backings such as 440U and 440L of FIG. 7 to work properly, it will be readily understood that the backing 440U must allow x-rays or other high energy rays to pass through it relatively easily. Moreover, the backing 440L must be transparent to visible light in order for visible light from the scintillation of elements 412B and 412C to be able to pass downward to the lens or mirror (not illustrated in FIG. 7). Considering also that the backings for the second layer elements 414A and 414D, which are not illustrated in FIG. 7, must allow passage of visible light, all such mounts such as backings 440U and 440L should preferably be made of material which is transparent to visible light and to x-rays. These backings 440U and 440L may simply be made of an optical flat.

Figure 9:
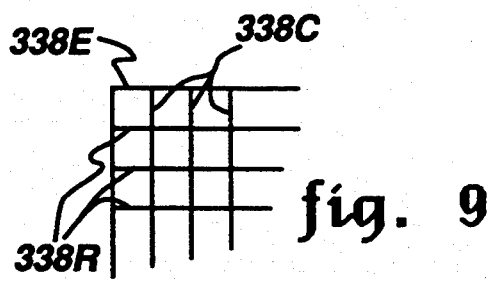
FIG. 9 shows a simplified top view of collimator plates connected together.

FIG. 7 has illustrated a specific manner in which the various detector elements within the detector array may be secured by use of the backings 440U and 440L and similar unillustrated backings. However, for designs which use the collimators 338 of FIG. 5, the collimator plates 338 could be constructed together using an arrangement illustrated by FIG. 8. In particular, the collimator plates 338 of FIG. 5 might consist of row collimator plates 338R and column collimator plates 338C. For ease of illustration, only one of each of these types of plates is shown. The row collimator plates 338R have a series of notches 342R, each of which mates with a corresponding notch 342C of a perpendicularly disposed column collimator plate 338C. Each of the notches 342R would receive part of a corresponding collimator plate 338C, there being one collimator plate 338C for each notch 342R in a particular collimator plate 338R. When the various collimator plates 338R and 338C are assembled together in the manner described, they form a pattern generally illustrated by FIG. 9 and edge collimator plates 338E may be disposed around the four sides resulting from the combination of the plates 338C and 338R. As illustrated in FIG. 9, a series of spaces are defined between the various collimator plates, and with reference back to FIG. 5, the various detector elements such as 312 and 314 may be glued or otherwise mounted at the proper height within the collimator plates. The edge collimator plates 338E may then be glued or otherwise fixed to the sidewalls 310S (FIG. 5 only).

Figure 11:
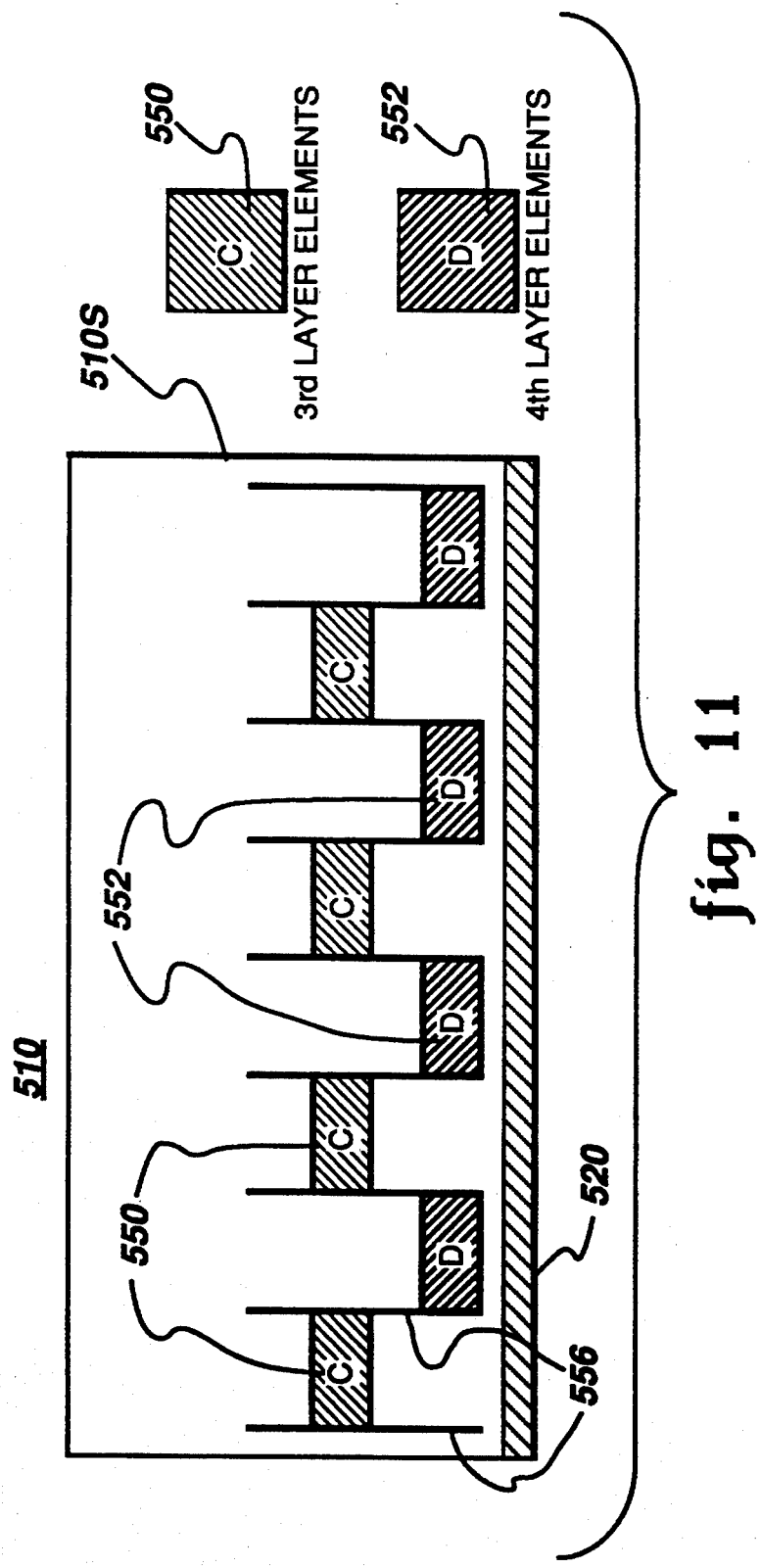
FIG. 11 shows a cross-section view along another row of the four layer transducer array of FIG. 11.

Turning now to FIGS. 10 and 11, a four layer detector array will be described. The four layer detector array 510 has components in the "500" series with the same last two digits as the corresponding component, if any, in the array 10 of FIGS. 1 and 2. For ease of illustration, both FIGS. 10 and 11 illustrate the same lens or mirror 520 and the same array sidewall 510S, which is on the of four sidewalls in the manner discussed above with respect to previously described embodiments. However, FIG. 10 illustrates various first layer elements 512, also labeled A as indicated on the legend at the side of FIG. 10 and various second layer elements 514, also labeled B. FIG. 11 illustrates the third layer elements 550, also labeled C, and fourth layer elements 552, also labeled D.

A top view of array 510 would be identical to that shown for array 410 of FIG. 6. If FIG. 6 is used to illustrate the top view of array 510, it would of course be understood that the elements labeled A are in the first layer, the elements labeled B are in the second layer, the elements labeled C are in the third layer, and the elements labeled D are in the fourth layer. If the view of FIG. 6 is assumed to represent the four layer detector array 510 of FIGS. 10 and 11, FIG. 10 corresponds to a cross section view along lines 10—10 of FIG. 6 and FIG. 11 corresponds to a simplified cross section view along lines 11—11 of FIG. 6. FIG. 11 is simplified in that, for ease of illustration, the detector elements from the first and second layers are not illustrated.

Figure 8:
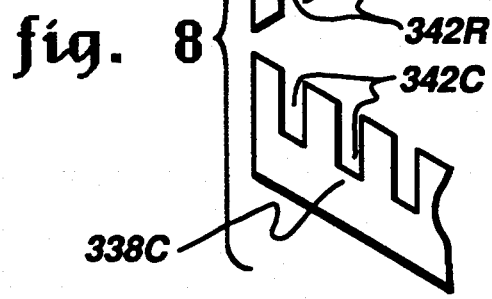
FIG. 8 shows an exploded perspective view of two collimator plates used with the present invention, with portions of the collimator plates broken away.

The elements 512 and 514 in the first and second layers respectively could be mounted to collimator plates 554 constructed in similar fashion to the various collimator plates 338 of FIG. 5 and 338C, 338R, and 338E of FIGS. 8 and 9. In similar fashion, the detector elements 550 and 552 would be mounted to collimator plates 556 which could be offset from the collimator plates 554.

It will be appreciated that in the arrangement of FIGS. 10 and 11, the detector array 510 has four layers, each of which has corresponding layer spaces or energy passage zones such as 512S for the first layer disposed between the elements of that corresponding layer. Some of the spaces 512S will be in registry with second layer elements 514, whereas other of the spaces 512S (not visible in the view of FIG. 10) will be in registry with third layer elements 550 or fourth layer elements 552 in order to define a double checkerboard type pattern as illustrated in FIG. 6.

The advantage of the four layer detector 510 of FIGS. 10 and 11 is that fabrication is simplified. The simplification results from the fact that a single saw cut can extend for the entire dimension of the detector array in each direction and no handling of the individual elements is required. Referring to FIG. 6 and considering that view to correspond again to a top view of the detector array of FIGS. 10 and 11, the various A elements could, for example, be cut by removing all of the material in the B, C, and D regions by a series of straight lines in two perpendicular directions. The elements for the B, C, and D layers could be cut in similar fashion by suitable choice of the locations of the cut lines. Alternately, the four layer structure could be built out of two sheets of scintillator by cutting one of the four layer patterns on the front and back of each of the two sheets. Using this approach, the full surface of the array can be irradiated and the cut lines (kerfs) can be the full width of the elements. This allows the thickest possible scintillator elements consistent with the spatial resolution of the system (defined by the center to center spacing of the array elements).

Although not shown, a four layer array could be made with each layer's elements mounted to a corresponding mount such as 440U and 440L of FIG. 7.

Since the various multilayer detector arrays of the present invention provide greater separation of the scintillation elements than in a single layer system, both the optical coupling and the x-ray coupling between adjacent elements is significantly reduced. Therefore, the cross talk performance of the multilayer detector arrays is significantly better than the single layer detector arrays.

In a typical CCD camera or subsystem, light collection from an area detector is dominated by the forward directed light from each element because the solid angle of the camera lens is small. Therefore, the multiple layer concept as described will only have a small effect on light collection efficiency.

Although the area detectors have been shown as planar and rectangular with square elements, other arrangements could of course be used. For example, the elements could have a surface area which is rectangular and has a length twice its width or some other aspect ratio. Other geometric shapes, such as hexagonal, might be used for the elements. Further, the detector array itself may be circular or have some other shape. Additionally, the detector array may have layers which are non-planar. For example, and with reference to FIG. 2, a detector array could be used having the same cross section as illustrated for array 10 of FIG. 2, but wherein each of layers 12L and 14L are concentric portions of cylinders. Alternately, the layers such as 12L and 14L might be portions of spheres or have other curved non-planar characteristics.

Although the discussion has concentrated on arrays which are two-dimensional, it will be readily appreciated that the principles of multilayering of detector elements could also be used on linear or one-dimensional arrays. Such as array would for example correspond to a single row or single column of elements in FIG. 1. The present description has emphasized arrays which are composed of elements for scintillation of x-rays or other high energy rays. However, the multilayering technique of the present invention would also be applicable to various other detection arrangements wherein ceramics, plastics, crystalline material, or other machineable materials are used. For example, each of the detector elements could be composed of piezoelectric materials for ultrasound. In that case, the detector elements could be used for detection of ultrasound and generation of an electrical signal using known properties of piezoelectric detectors and, additionally, each of the piezoelectric elements could be used for generating ultrasound upon application of an electrical signal to it using known principles. Thus, the multilayering techniques of the present invention may be applicable to transducer arrays which are excited by application of electrical signals in order to produce another form of energy. In other words, the invention could be used for transducer arrays which are not used for sensing energy, but which are used to generate energy.

Although very specific embodiments and materials have been discussed herein, it is to be readily understood that these are for illustrative purposes only. Various modifications and adaptations will be apparent to those of skill in the art. Accordingly, the scope of the present invention should be determined by reference to the claims appended hereto.

What is claimed is:
1. A transducer array comprising:
a first layer with first transducing elements arranged in a pattern and a plurality of first energy passages between and adjacent to said first transducing elements;
a second layer with second transducing elements arranged in a pattern offset in an energy direction from said first layer, each of said second transducing elements in registry with a corresponding one of said first energy passages, each of said first energy passages allowing free passage of a type of energy which may interact with said second transducing elements;
collimator plates extending generally in said energy direction and disposed at outer peripheries of each of said first and second transducing elements; and
wherein each of said first and second transducing elements perform the same transducing and is made of transducing material which provides improved transducing when the thickness of the transducing material is increased.

2. The transducer array of claim 1 wherein the transducing material is selected from the group consisting of: plastic materials, crystalline materials, and ceramic materials.

3. The transducer array of claim 1 wherein said transducing material is selected from the group consisting of: scintillating materials and piezoelectric materials.

4. The transducer array of claim 1 wherein each of said first and second layers is planar.

5. The transducer array of claim 1 wherein said second layer has a plurality of second energy passages between and adjacent to said second transducing elements, there being a second energy passage in registry with, and corresponding to, each of said first transducing elements.

6. The transducer array of claim 5 further comprising means for receiving energy rays passing from said first transducing elements through said second energy passages and for receiving energy rays from said second transducing elements.

7. The transducer array of claim 5 wherein each of said first and second transducing elements is made of scintillation material.

8. The transducer array of claim 7 further comprising a first support having at least some of said first transducing elements mounted thereto and a second support having at least some of said second transducing elements mounted thereto, said first support being transparent to energy which triggers scintillation in said scintillation material, and said second support being transparent to light.

9. The transducer array of claim 8 wherein both of said first and second supports are transparent to both said energy which triggers scintillation and light.

10. The transducer array of claim 9 further comprising a third support separated from said first support by said first transducing element, at least some of said first transducing elements mounted to said third support and a fourth support separated from said second support by said second transducing elements and at least some of said second transducing elements mounted to said fourth support.

11. The transducer array of claim 7 further comprising:
a third layer with third transducing elements arranged in a pattern offset in an energy direction from said second layer and a plurality of third energy passages between and adjacent to said third transducing elements, each of said third transducing elements in registry with a corresponding one of said first energy passages and in registry with a corresponding one of said second energy passages;
a fourth layer includes fourth transducing elements arranged in a pattern offset in an energy direction from said second layer, each of said fourth transducing elements in registry with a corresponding one of said first energy passages, in registry with a corresponding one of said second energy passages, and in registry with a corresponding one of said third energy passages; and
wherein each of said third and fourth transducing elements is made of a scintillation material.

12. The transducer array of claim 11 further comprising collimator elements extending generally in said energy direction and disposed at outer peripheries of each of said first, second, third, and fourth transducing elements.

13. The transducer array of claim 1 further comprising:
a third layer with third transducing elements arranged in a pattern offset in an energy direction from said second layer and a plurality of third energy passages between and adjacent to said third transducing elements, each of said third transducing elements in registry with a corresponding one of said first energy passages and in registry with a corresponding one of said second energy passages;
a fourth layer includes fourth transducing elements arranged in a pattern offset in an energy direction from said second layer, each of said fourth transducing elements in registry with a corresponding one of said first energy passages, in registry with a corresponding one of said second energy passages, and in registry with a corresponding one of said third energy passages; and
wherein each of said third and fourth transducing elements are made of a transducing material which provides improved transducing when the thickness of the transducing material is increased.

14. The transducer array of claim 1 wherein said transducer array is two dimensional with the first and second transducing elements both arranged in rows and columns.

15. The transducer array of claim 1 wherein said transducer array is a detection array and said first and second transducing elements are detecting elements.

16. A detection array comprising:
a first layer with first detecting elements arranged in a pattern and a plurality of first energy passages between and adjacent to said first detecting elements;
a second layer with second detecting elements arranged in a pattern such that the second detecting elements are offset in an energy direction from the first detecting elements of said first layer, each of said second detecting elements in registry with a corresponding one of said first energy passages, each of said first energy passages allowing free passage of energy which is detectable by said second detecting elements, said second layer further having a plurality of second energy passages between said second detecting elements, each of said first detecting elements being in registry with a corresponding one of said second energy passages; and
wherein each of said first and second detecting elements detect the same type of energy and is made of detecting material.

17. The transducer array of claim 16 wherein said detecting materials are selected from the group consisting of: scintillating materials and piezoelectric materials.

18. The transducer array of claim 16 wherein the detection array is two dimensional with the first and second detecting elements both arranged in rows and columns.

19. A detection array comprising:
a first layer with first detecting elements arranged in a pattern and a plurality of first energy passages between said first detecting elements;
a second layer with second detecting elements arranged in a pattern and a plurality of second energy passages between said second detecting elements; and means for respectively supporting said first and second layers to offset said layers with respect to each other in an energy direction, and to maintain each of said first detecting elements in registry with a corresponding one of said second energy passages, and each of said second detecting elements in registry with a corresponding one of said first detecting elements.

20. The detection array of claim 19 wherein:

each of said first and second elements is disposed to receive energy in a first form, and convert it into a corresponding amount of energy in a second form; and each of said first energy passages contains material which is transparent to energy in said first form, and each of said second energy passages contains material which is transparent to energy in said second form.

21. The detection array of claim 19 wherein:

said first detecting elements and said second detecting elements are all formed from the same type of material.

* * * * *